United States Patent [19]

Kielinski

[11] Patent Number: 5,306,112
[45] Date of Patent: Apr. 26, 1994

[54] DOCK-AID

[76] Inventor: Thomas P. Kielinski, 215 Stenton Ave., Plymouth Meeting, Pa. 19462

[21] Appl. No.: 923,333

[22] Filed: Jul. 31, 1992

[51] Int. Cl.$^5$ .......................... B60P 1/04; E01D 1/00; B62B 3/00

[52] U.S. Cl. .................................. 414/490; 14/69.5; 14/72.5; 280/47.24; 280/47.3; 414/607

[58] Field of Search ............... 414/490, 373, 402, 607; 14/69.5, 71.1, 71.3, 72.5; 280/47.17, 47.24, 47.27, 47.32, 47.131, 47.315, 78, 47.33, 47.34, 47.30; 254/813

[56] References Cited

U.S. PATENT DOCUMENTS

| | | | |
|---|---|---|---|
| 1,139,240 | 5/1915 | Viche | 14/69.5 |
| 1,377,147 | 5/1921 | Dillon | |
| 1,845,529 | 2/1932 | Suarez | 280/47.30 |
| 2,499,458 | 3/1950 | Campbell | 280/47.24 |
| 2,739,325 | 3/1956 | Grace, Jr. | 14/69.5 |
| 2,788,751 | 4/1957 | Russell | 14/69.5 |
| 3,183,536 | 5/1965 | Noland | 14/69.5 |
| 3,188,107 | 6/1965 | Quayle | |
| 3,261,489 | 7/1966 | Miles | 414/607 |
| 3,298,705 | 1/1967 | Neaverson et al. | |
| 3,677,571 | 7/1972 | Maturo et al. | 280/47.3 |
| 4,087,876 | 5/1978 | Fillman et al. | 14/72.5 |
| 5,065,468 | 11/1991 | Sherrod | 14/72.5 |

FOREIGN PATENT DOCUMENTS

| | | | |
|---|---|---|---|
| 792623 | 8/1968 | Canada | 280/47.24 |
| 1289787 | 2/1969 | Fed. Rep. of Germany | 14/72 |
| 409784 | 10/1966 | Switzerland | 14/72 |
| 928881 | 6/1963 | United Kingdom | 14/69.5 |
| 2101558 | 1/1983 | United Kingdom | 414/490 |

Primary Examiner—Michael S. Huppert
Assistant Examiner—R. B. Johnson
Attorney, Agent, or Firm—Howson and Howson

[57] ABSTRACT

A loading dock-aid is described that facilitates the lifting and placing of heavy dock plates between the edge of a dock and the back end of a delivery truck. The dock-aid has a lifting boom with a hooked end portion that is inserted into prescribed holes in the dock plate and that is connected via a yoke framework to a roller and an extended handle. The handle provides leverage for a workman to exert pressure thereon and lift up the dock plate. The roller allows the workman to position the whole apparatus in a specific location to then lower the dock plate over the gap between the truck and the dock.

6 Claims, 5 Drawing Sheets

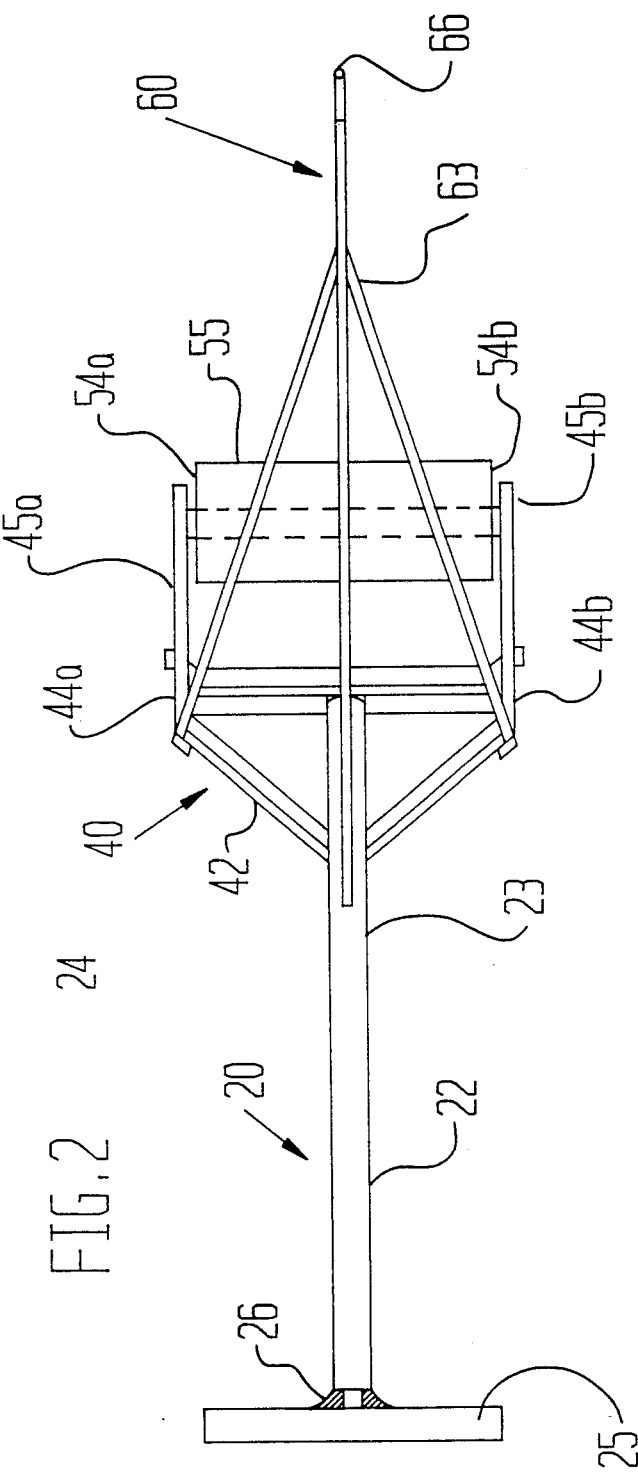
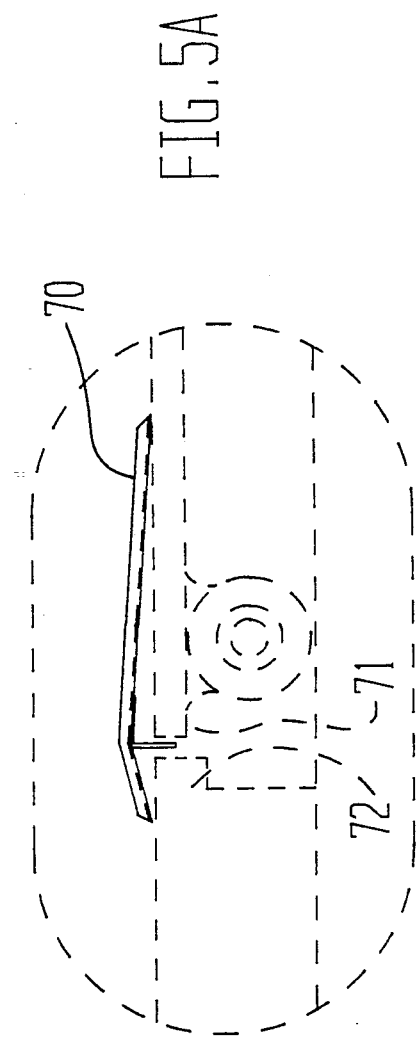

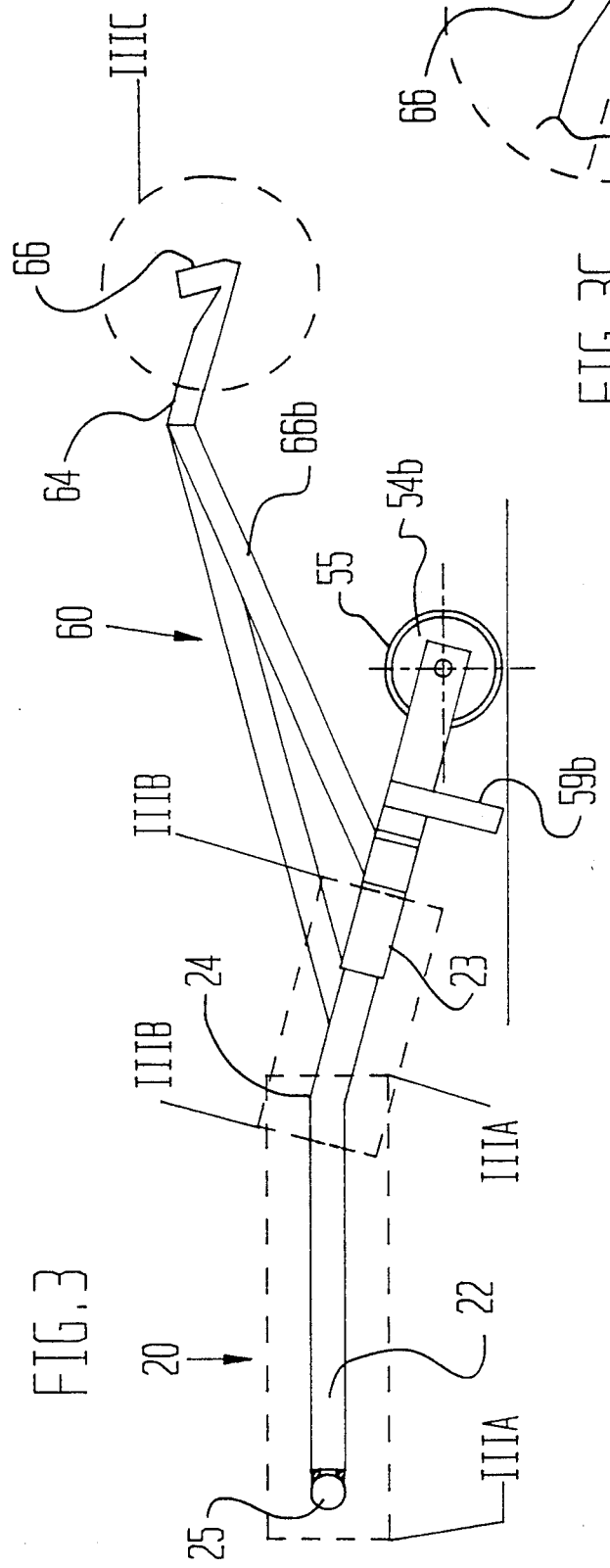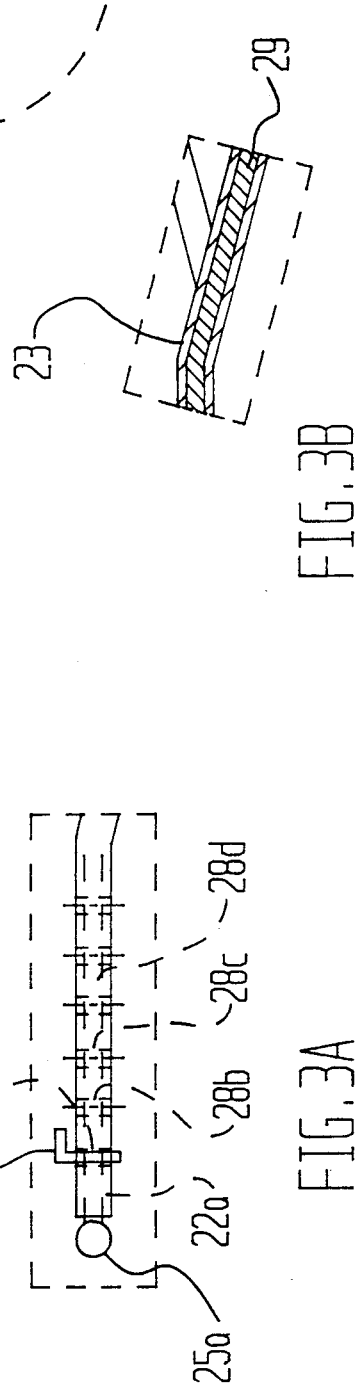

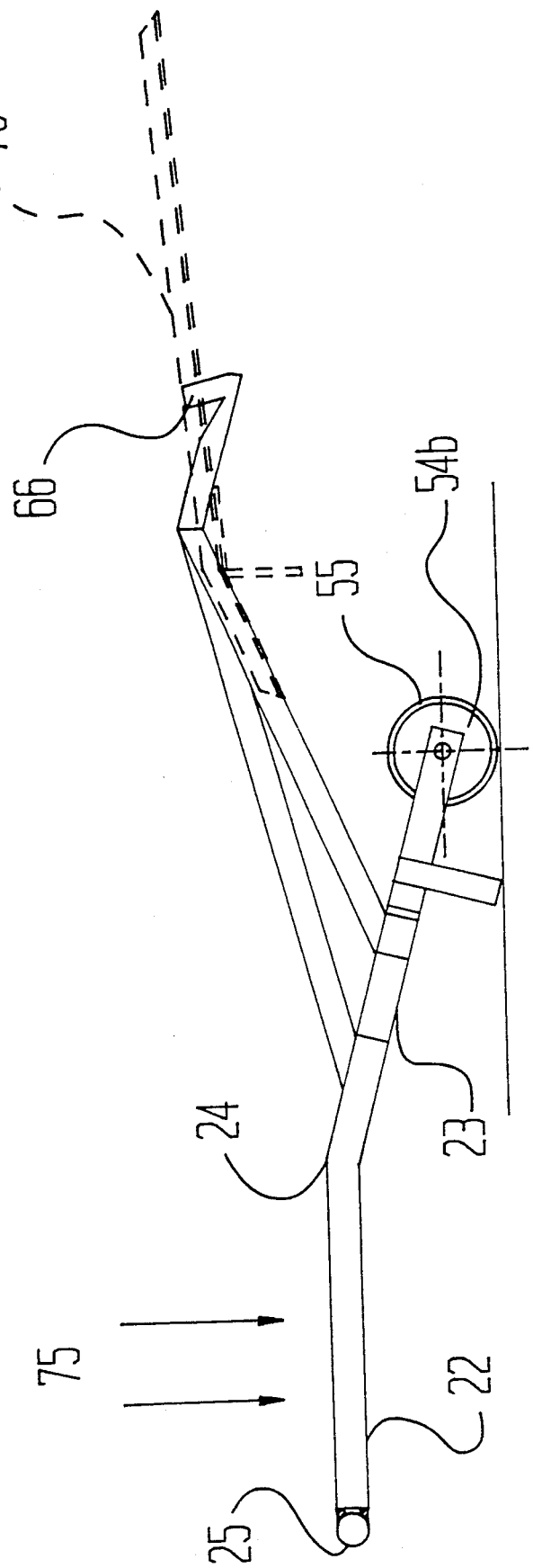

DOCK-AID

BACKGROUND OF THE INVENTION

In many business or warehouse environments, there is a loading dock available for delivery trucks to pull u next to for loading or unloading. A typical loading dock is an extension of the building floor through an opening in the side wall and, among other features, can have a dock ledge and bumper strip about as wide as the rear end of the trailers that make deliveries. The driver backs the trailer up to the edge of the loading dock and the loading or unloading operations start.

A common piece of equipment found wherever a loading dock exists is a dock plate or dock board, a device made from heavy gauge aluminum and designed to bridge the gap between the end of the trailer and the edge of the loading dock. In many cases, this gap could be anywhere from six to twelve inches, which would prevent any wheeled loading equipment, such as dollies or forklifts, from moving heavy materials on or off the trailer. In addition to this spatial separation, there quite often is an elevational difference between the two platforms. Dock plates can weigh anywhere up from to two or four hundred pounds and can be up to six feet in length by six feet in width and they are meant to be stored out of the way of the loading dock until needed.

The problem with this system is that it is necessary to move this heavy and awkward dock board in and out of a particular dock as the delivery trucks arrive and depart. In many situations, this means taking two men from their normal duties and causing them to handle this task, not a very efficient use of manpower. In certain cases, it was found to be necessary to build a mechanical system with a dock board right into the loading dock area and then, one person could activate the mechanism as necessary. This might not prove to be all that advantageous though where there are more than one dock where deliveries are made. In that case, it would take a large capital outlay to fit these mechanisms to each dock. The solution to this problem is in a device that allows a single person to move a dock plate easily, quickly and efficiently by himself.

SUMMARY OF THE INVENTION

It is therefore an object of the present invention to provide a device that allows a single person to easily lift and maneuver a loading dock plate by gaining an advantage in the leverage necessary to lift said plate.

It is another object of the present invention to provide such a device that is designed to enable persons of different heights, weights and strengths to use it.

It is still another object of the present invention to provide such a device that can be quickly and easily transported between various loading docks.

These and many other attendant advantages and features are provided in a device known as a dock-aid wherein a boom having proximal and distal ends, with dock board latching means on its said distal end, is connected at its proximal end to a handle and yoke combination. The yoke has several strengthening supports attached to it and is connected to a James Wheel roller TM for maneuverability. The handle extends from the yoke at a predetermined angle to give the operator sufficient leverage, when a moderate downward force is applied thereto, to raise a dock plate caught by the latching means. The dock-aid and dock board can be positioned by rolling movement of the roller.

The novel features which are believed to be characteristic of the invention, both as to its organization and methods of operation, together with further objects and advantages thereof, will be better understood from the following descriptions in connection with the accompanying drawings in which the presently preferred embodiments of the invention are illustrated by way of examples. It is to be expressly understood, however, that the drawings are for purposes of illustration only and are not intended as a definition of the limits of the invention.

BRIEF DESCRIPTION OF THE DRAWINGS

FIG. I shows a perspective view of a dock-aid in its resting position on a warehouse floor:

FIG. II shows a plan view of the dock-aid;

Figure 1:
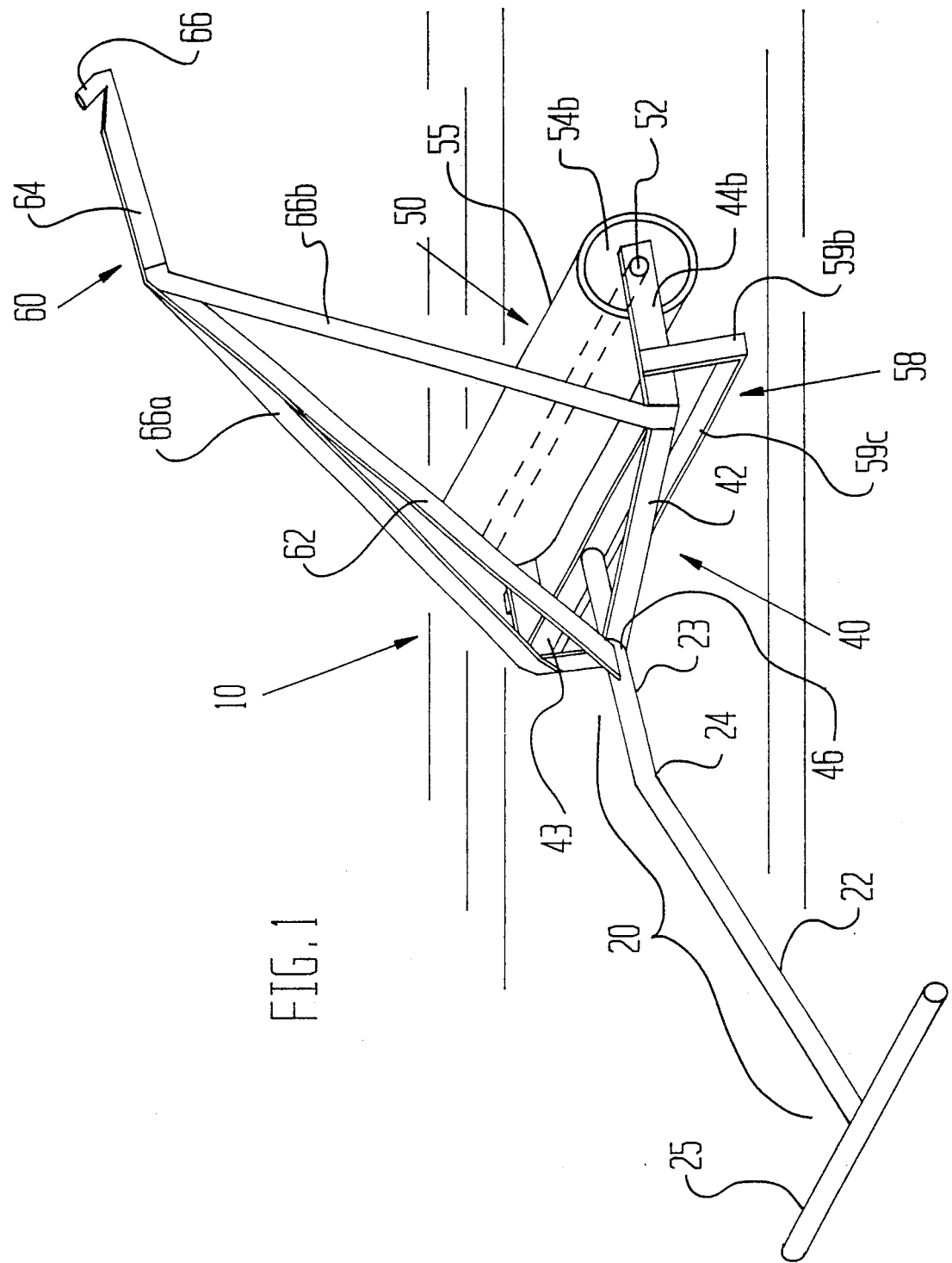
Figure 5:
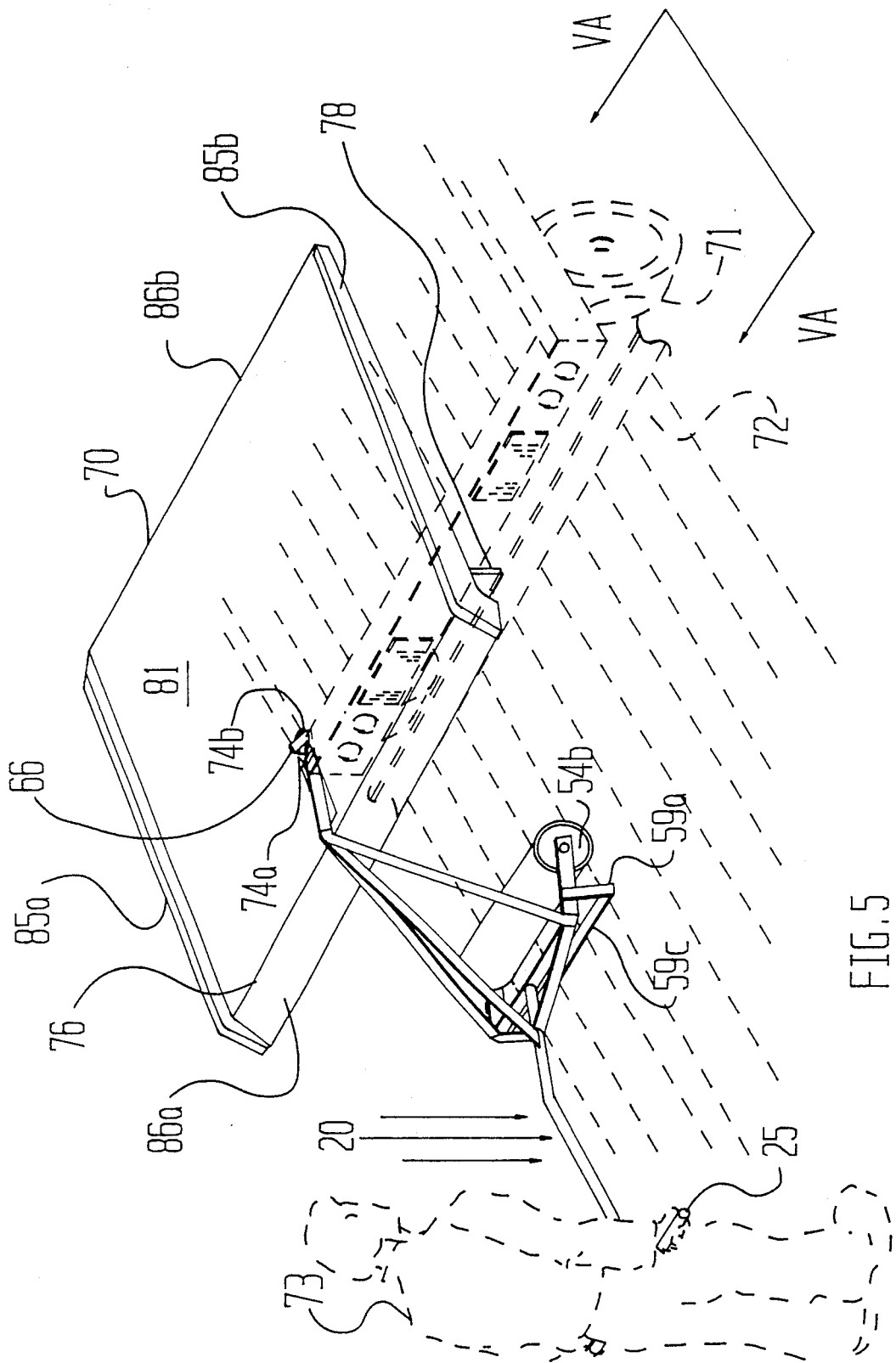

FIG. III shows a side elevation of the dock-aid in its resting position;

FIG. IIIA shows an alternative embodiment of the upper handle of the dock-aid;

FIG. IIIB shows a fragmented, partially broken away view of the lower handle, as taken at lines IIIB—IIIB of FIG. III;

FIG. IIIC shows an enlarged side elevation view of the hooking pin at the tip of the boom as taken from FIG. III; and FIG. IV shows a side elevation of the dock-aid in its lifting position, showing schematically force arrows bearing down on the upper handle.

FIG. V shows a perspective view of the dock-aid being used to place a loading dock plate between the edge of a warehouse loading dock and the back edge of a vehicle (both shown in phantom); and FIG. VA shows a side elevation of the dock plate of FIG. V, as the dock plate is set between the edge of a loading dock and the rear edge of a truck.

DETAILED DESCRIPTION OF THE PREFERRED EMBODIMENT

Referring now to the drawings, wherein like reference characters designate like or corresponding parts throughout the several views, there is illustrated in FIG. I a dock-aid 10 comprised of a length of material called the handle 20, having upper and lower sections, a yoke framework 40 attached to the lower end of handle 20 and a boom 60 extending from the lower end of handle 20, at a point near the union of the yoke and the handle. Yoke framework 40, in the shape of an inverted "V", is comprised of an angled yoke 42, having oppositely disposed end pieces 44a and 44b, and the yoke brace 43, and has a metal wheel 50, called a JAMES WHEEL roller JAMES WHEEL being a trademark of applicant) for maneuverability attached on an axle rod 52 that extends between pieces, 44a and 44b (44a not seen in FIG. I), all as will be described more fully below. Boom 60 is attached at its proximal end 62 to the lower end of handle 20 and has, at its distal end, dock plate hooking means 66 to be positioned in appropriately sized dock plate apertures, or cut-out sections 74, to allow dock-aid 10 to effectively secure, or grasp, a dock plate (as shown in FIG. V).

FIG. II shows a plan view of dock-aid 10. The upper section 22 and lower section 23 of the handle are each comprised of hollow, one inch steel pipe (or similar materials) and these sections join at a handle bend 24 (as seen in FIG. III) for a purpose to be described below.

Attached to the outer end of upper section 22 is a handle bar 25 preferably made of the same material. Bar 25 can be welded at 26 to the end of section 22, or, in an alternate embodiment as shown in FIG. IIIA, can be attached (at 25a) to a smaller-diameter, handle-extension section 22a, that slidingly fits inside section 22. Section 22a is secured in one of a plurality of extended positions by a key 27 slipping into one of aligned keyway apertures 28a, 28b, 28c, ..., 28f. Lower section 23, as seen more clearly in FIG. IIIB, contains a steel reinforcing bar 29 that extends, inside section 23, from the junction of section 23 and yoke brace 43. Preferably, upper section 22 is approximately 14 inches long, extendible to 20 inches, and lower section 23 is approximately 20 inches long, so that the length of handle 20 can be adjusted through a range from approximately from 34 to 40 inches long.

Yoke framework 40 is comprised of yoke 42, which is in the shape of a chevron and preferably made of 2¼" wide by ¼" thick flat steel bar, and yoke brace 43, preferably made of 1" wide by ¼" thick flat steel bar, joined, as by welding or other known methods, between end pieces 44a and 44b, to form a triangular construction. As mentioned, yoke 42 is made in the shape of an inverted "V" and has, at the point 46 thereof, a hole bored therethrough to allow the lower section 23 of handle 20 to fit therein. Oppositely-disposed end pieces 44a and 44b are formed in the same length, width and thickness and support opposite ends of axle rod 52 therebetween. Axle rod 52 supports, by extending through apertures bored in the center thereof, a pair of circular center rims 54a and 54b (as seen in FIG. II) that can preferably be made of ⅜" thick steel plate. Rims 54a, 54b are force-fitted into the ends of tubular section 55, which section 55 can be made from 1⅜" thick steel stock, or similar material, and preferably is 15 inches long with an outside diameter of 7 ⅝". This JAMES WHEEL(TM) roller 50 provides a sturdy, yet mobile, base from which handle 20 and boom 60 operate from. As an alternate embodiment, a plurality of small wheels (not shown in the figures) could be used in place of the JAMES WHEEL(198) roller. Additionally, a unit stand 58 is provided to extend from end pieces 44a, 44b as shown. Stand 58 is formed from two, oppositely-disposed ears 59a, 59b, which extend orthogonally from end pieces 44a, 44b, respectively, and center bar 59c, which joins therebetween. Unit stand 58 can be attached to yoke 40 by welding or other fastening methods known in the art.

Boom 60 is comprised of a first part or inner boom 62 and a second part or outer boom 64 and a pair of boom supports 66a and 66b, all joined, as by welding or other known means, at junction 63 to form a second triangular construction. Outer boom 64 carries a plate hook 66, as will be described. Inner boom 62 is preferably a section of flat, steel bar, approximately 20 inches long, welded adjacent point 46 to lower section 23 of handle 20. Outer boom 64 can be from approximately 10 to 20 inches in length. In a similar fashion, supports 66a and 66b are attached adjacent end pieces 44a, 44b, respectively, to yoke 40. The opposite ends of supports 66a, 66b are brought together at the outward end of inner boom 62 where the inner end of outer boom 64 is joined. The bracing structure thus established allows a load, such as a dock plate 70, to be suspended from the plate hook 66 attached to the distal end of outer boom 64 (as seen in FIG. IV, an elevation view of the invention with dock plate 70 in phantom). As, seen more clearly in FIG. IIIC, an enlarged view of hook 66 as taken from FIG. III, hook 66 can be made by bending the end of outer section 64 around from a straight section to a perpendicular position, and then to an acute angle, as shown by the two dashed lines.

Operation

The use of dock-aid 10 is shown in FIGS. V and VA. In these figures, the rear end of a truck 71, the edge of a loading dock 72 and a workman 73 are all shown in phantom. Truck 71 backs up to the edge 72, leaving a gap between the two surfaces. A workman 73 grasps the handle bar 25 of dock-aid 10 and maneuvers it to align hook 66 with elongated cut-out section or aperture 74a and hole or aperture 74b in dock plate 70 (see FIG. V). Dock plate 70 is a substantially square or rectangular shaped device having an upper, vehicle-bearing flat surface 81, opposite side edges 85a, 85b and oppositely-disposed dock-engaging and vehicle-engaging edges 86a, 86b extending therefrom. As seen in FIG. V, dock plate 70 has a perpendicular wall 78 extending from the underside of vehicle-bearing flat surface, approximately below a peak in the surface, to provide a space underneath the flat surface. Cut-out section 74a is substantially in the shape of an oblong figure and cut-out section 74b is circular. Both are formed in the upper flat surface in a predetermined location on the centerline within the front one-half of dock plate 70 just behind peak 76. The workman will lift handle 20 up to force hook 66 down through section 74a so that the tip is below hole 74b. By pressing down on handle 20, as shown schematically by arrows 75, workman 73 uses the leverage of lower section 23 and inner boom 62, and forces hook 66 to rise so that the tip engages in hole 74b and catches the flat surface of dock plate 70 and the combination of the handle 20 and the lifting boom 60 being in imaginary planes perpendicular to the axis of the JAMES WHEEL(TM) 50 generates sufficient leverage to cause boom 60; and dock plate 70 to rise up. The force generated at the handle end of dock-aid 10 must overcome the weight of dock plate 70 at the opposite end. Once this is accomplished, both the handle 20 and dock plate 70 are above the axis of JAMES WHEEL (TM)roller 50 and now workman 73 can maneuver dock-aid 10 and plate 70 to the desired location and set plate down (as shown in FIG. VA). Of course, its an easy movement to then simply remove hook 65 from holes 74 and roll dock-aid 10 out of the way of operations.

Finally, while the dock-aid has been described with reference to a particular embodiment, it should be understood that the embodiment is merely illustrative as there are numerous variations and modifications which may be made by those skilled in the art. For example, it is also within the scope of the inventive concept to have a plurality of hooking means, spaced apart, affixed to individual booms to engage the dock plate at more than one location across its width. This will add further to lifting a balanced and even load. Thus, the invention is to be construed as being limited only by the spirit and scope of the appended claims.

What I claim is:

1. A dock aid and dock plate in combination, in which said dock aid comprises
   a. roller means for rolling upon a surface, said roller means having an axis;
   b. yoke means having end pieces spaced apart from each other, said end pieces being intersected by said axis of the roller means, and said roller means being positioned between said end pieces and rotatably mounted thereon, whereby said roller means can rotate on its axis in said yoke means;
c. handle means connected to said yoke means and extending therefrom in a first direction in an imaginary plane to which said axis of the roller means is substantially perpendicular, said handle means having an end remote from said roller means and manually graspable means at said remote end;
d. lifting boom means also connected to said yoke means and extending therefrom in a second direction in said imaginary plane, said lifting boom means having a distal end remote from said roller means; and
e. means, at said distal end, for engaging and holding a dock plate;

wherein:
f. said handle means and said lifting boom means are arranged on said yoke so that, with said roller means engaged with a horizontal surface, the graspable means and the engaging and holding means can both be above said axis of the roller means and extend toward opposite sides of said roller means;
g. said lifting boom means comprises a first part connected directly to said yoke, and a second part connected to said first part at a location remote from said yoke;
h. said second part extending obliquely downward from said first part; and
i. said means for engaging and holding said dock plate comprises hook means extending upwardly from said second part of the lifting boom means;

and in which:
said dock plate has a dock-engaging edge, opposite side edges extending substantially perpendicular to said dock-engaging edge, an opening extending through said plate and elongated in a direction substantially perpendicular to said dock-engaging edge at an intermediate location between said side edges, and a hole for receiving said hook means, said hole being aligned with the direction of elongation of said elongated opening, said second part of the lifting boom means extending downward from said first part through said elongated opening, and said hook means extending upward from said second part and through said hole.

2. A dock-aid and dock plate in combination according to claim 1 in which said hook means comprises a projection forming an acute angle with said second part.

3. A dock aid and dock plate in combination, in which said dock aid comprises
a. roller means for rolling upon a surface, said roller means having an axis;
b. yoke means having end pieces spaced apart from each other, said end pieces being intersected by said axis of the roller means, and said roller means being positioned between said end pieces and rotatably mounted thereon, whereby said roller means can rotate on its axis in said yoke means;
c. handle means connected to said yoke means and extending therefrom in a first direction in an imaginary plane to which said axis of the roller means is substantially perpendicular, said handle means having an end remote from said roller means and manually graspable means at said remote end;
d. lifting boom means also connected to said yoke means and extending therefrom in a second direction in said imaginary plane, said lifting boom means having a distal end remote from said roller means; and
e. means, at said distal end, for engaging and holding a dock plate;

wherein:
f. said handle means and said lifting boom means are arranged on said yoke so that, with said roller means engaged with a horizontal surface, the graspable means and the engaging and holding means can both be above said axis of the roller means and extend toward opposite sides of said roller means;
g. said lifting boom means comprises a first part connected directly to said yoke, and a second part connected to said first part at a location remote from said yoke;
h. said second part extending obliquely downward from said first part; and
i. said means for engaging and holding said dock plate comprises hook means extending upwardly from said second part of the lifting boom means and in which:
said dock plate has a dock-engaging edge, opposite side edges extending substantially perpendicular to said dock-engaging edges, an opening extending through said plate and elongated in a direction substantially perpendicular to said dock-engaging edge from a location adjacent a point on said edge approximately midway between said side edges, and a hole for receiving said hook means, said hole being aligned with the direction of elongation of said elongated opening, said second part of the lifting boom means extending downward from said first part through said elongated opening, said hook means extending upward from said second part and through said hole.

4. A dock-aid and dock plate in combination according to claim 3 in which said hook means comprises a projection forming an acute angle with said second part.

5. A dock aid and dock plate in combination, in which said dock aid comprises:
a. roller means for rolling upon a surface, said roller means having an axis;
b. yoke means having end pieces spaced apart from each other, said end pieces being intersected by said axis of the roller means, and said roller means being positioned between said end pieces and rotatably mounted thereon, whereby said roller means can rotate on its axis in said yoke means;
c. handle means connected to said yoke means and extending therefrom in a first direction in an imaginary plane to which said axis of the roller means is substantially perpendicular, said handle means having an end remote from said roller means and manually graspable means at said remote end;
d. lifting boom means also connected to said yoke means and extending therefrom in a second direction in said imaginary plane, said lifting boom means having a distal end remote from said roller means; and
e. means, at said distal end, for engaging and holding a dock plate;

wherein:
f. said handle means and said lifting boom means are arranged on said yoke so that, with said roller means engaged with a horizontal surface, the graspable means and the engaging and holding means can both be above said axis of the roller means and extend toward opposite sides of said roller means;

g. said lifting boom means comprises a first part connected directly to said yoke, and a second part connected to said first part at a location remote from said yoke;

h. said second part extending obliquely downward from said first part; and i. said means for engaging and holding said dock plate comprises hook means extending upwardly from said second part of the lifting boom means;

and in which said dock plate comprising a load-bearing surface having a dock-engaging edge, a vehicle-engaging edge opposite said dock-engaging edge, and opposite side edges extending substantially perpendicular to said dock-engaging and vehicle-engaging edges, the load bearing surface extending upward from said dock-engaging edge to a peak at a location intermediate said dock-engaging and vehicle-engaging edges and downward from said peak to said vehicle-engaging edge, whereby a space is provided underneath said load-bearing surface when the dock plate is resting on a horizontal surface, an opening extending through the load-bearing surface of said plate and elongated in a direction substantially perpendicular to said dock-engaging edge at a location approximately midway between said side edges, and a hole for receiving said hook means, said hole being aligned with the direction of elongation of said elongated opening, said second part of the lifting boom means extending downward from said first part through said elongated opening into said space, and said hook means extending upward from said second part and through said hole.

6. A dock-aid and dock plate in combination according to claim 5 in which said hook means comprises a projection forming an acute angel with said second part.

* * * * *